US008721252B2

(12) United States Patent
Osada et al.

(10) Patent No.: US 8,721,252 B2
(45) Date of Patent: May 13, 2014

(54) WORK ALIGNING SYSTEM AND METHOD OF MOVING WORK

(75) Inventors: Atsushi Osada, Tochigi (JP); Kenichi Asamizu, Tochigi (JP); Hirofumi Kimura, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 903 days.

(21) Appl. No.: 12/922,516

(22) PCT Filed: Feb. 16, 2009

(86) PCT No.: PCT/JP2009/052503
§ 371 (c)(1),
(2), (4) Date: Sep. 14, 2010

(87) PCT Pub. No.: WO2009/116337
PCT Pub. Date: Sep. 24, 2009

(65) Prior Publication Data
US 2011/0018291 A1    Jan. 27, 2011

(30) Foreign Application Priority Data

Mar. 17, 2008   (JP) .................................. 2008-068524

(51) Int. Cl.
*B65G 47/14*    (2006.01)
(52) U.S. Cl.
CPC ................. *B65G 47/1478* (2013.01)
USPC ...... 414/331.01; 414/737; 414/808; 414/267; 414/268
(58) Field of Classification Search
CPC .............. B65G 1/06; B65G 1/10; B65G 1/12; B65G 1/133; B65G 65/02; B65G 47/1407; B65G 47/1478

USPC ................. 186/56; 198/341.05, 345.1, 345.2, 198/347.1, 347.2, 348, 353, 359, 364, 198/370.1, 890, 890.1; 414/266, 267, 268, 414/269, 331.01, 331.03, 331.13, 331.18, 414/737, 808, 744.7
See application file for complete search history.

(56) References Cited

U.S. PATENT DOCUMENTS 4,527,326 A * 7/1985 Kohno et al. ................... 29/705
4,752,665 A    6/1988 Del Santo
(Continued)

FOREIGN PATENT DOCUMENTS

CN    1010924 A    6/1986
JP    63-169230 A    7/1988
(Continued)

*Primary Examiner* — Saul Rodriguez
*Assistant Examiner* — Brendan Tighe
(74) *Attorney, Agent, or Firm* — Arent Fox LLP

(57) ABSTRACT

A work aligning system capable of easily altering the kind of works to be aligned. The work aligning system (1) comprises a storage device (10) in which nuts (11) are stored, a take-out base (30) on which the nuts (11) are placed, and a robot (20) for grasping and taking out the nuts from the take-out base (30) and aligning the nuts. An electromagnet (53) is provided at the tip end of the robot arm (23) of the robot (20). The storage device (10) is equipped with a plurality of buckets (131-134) in which nuts (11) of different kinds are stored, and a feed screw mechanism (14) for moving one bucket selected from the plurality of buckets (131-134) to a position near the take-out base (30). The take-out base (30) is equipped with a part (31) on which the nuts (11) are placed and a drive device (32) for discharging the nuts (11) on the part (31) to one bucket selected from the plurality of buckets (131-134).

5 Claims, 3 Drawing Sheets

(56) References Cited

U.S. PATENT DOCUMENTS

| | | | |
|---|---|---|---|
| 4,986,729 A * | 1/1991 | Ohlenbusch | 414/787 |
| 5,868,545 A * | 2/1999 | Kasai et al. | 414/808 |
| 6,516,935 B1 * | 2/2003 | McLennan | 198/347.3 |
| 7,762,759 B2 * | 7/2010 | Del Fabro et al. | 414/745.7 |
| 2008/0044261 A1 * | 2/2008 | Neeper et al. | 414/266 |
| 2011/0142581 A1 * | 6/2011 | Freudelsperger | 414/267 |

FOREIGN PATENT DOCUMENTS

| | | |
|---|---|---|
| JP | 3-195620 A | 8/1991 |
| JP | 6-126545 A | 5/1994 |
| JP | 6-126555 A | 5/1994 |
| JP | 6-297257 A | 10/1994 |
| JP | 8-126917 A | 5/1996 |
| JP | 2002-18656 A | 1/2002 |

* cited by examiner ets 131 to 134 described later) in which works of different types are stored, and a transfer device (e.g., a feed screw mechanism 14 described later) that causes one bucket selected from among the plurality of buckets to be positioned in a vicinity of the extraction rack. The extraction rack includes a placement unit (e.g., a placement unit 31 described later) on which the works are placed, and a drive unit (e.g., a drive unit 32 described later) configured to discharge the works on the placement unit to the one bucket selected from among the plurality of buckets.

WORK ALIGNING SYSTEM AND METHOD OF MOVING WORK

CROSS-REFERENCE TO RELATED APPLICATION

This application is a National Stage entry of International Application No. PCT/JP2009/052503, filed Feb. 16, 2009, which claims priority to Japanese Patent Application No. 2008-068254 filed Mar. 17, 2008, the duty of disclosure of the prior application is incorporated in its entirety by reference.

TECHNICAL FIELD

The present invention relates to a work aligning system and a method of moving a work. Specifically, it relates to a work aligning system that grips and aligns a work and a method of moving a work.

BACKGROUND ART

Conventionally, parts have been attached to a product with bolts by a robot in the manufacturing line of automobiles. Such bolts are supplied to the robot by way of a parts feeder.

The parts feeder includes a hopper, and when an operator places the bolts into this hopper, the bolts thus placed are aligned and discharged (refer to Patent Document 1).

However, since the bolts that can be aligned by one parts feeder are of one type, a plurality of parts feeders become necessary if several types of bolts are used in a manufacturing line. Accordingly, a problem has been posed that an increase in cost is inevitable since parts feeders are expensive.

Therefore, an extraction rack to which the bolts are supplied and a robot that grips and aligns the bolts supplied to the extraction rack have been proposed. According to this robot, it is possible to decrease the cost even if any type of bolt is supplied, since this robot can grip and align any type of bolt.
Patent Document 1: Japanese Unexamined Patent Application Publication No. H6-126555

DISCLOSURE OF THE INVENTION

Problems to be Solved by the Invention

However, with this robot, when the type of bolts is changed, it has been necessary to remove the bolts from the extraction rack by hand, or to provide an extraction rack for each type of bolt. As a result, there have been problems in that it is difficult to change the type of bolts to be aligned, so that the operation rate tends to decline.

The present invention has an object of providing a work aligning system and a method of moving a work that enable an easy change in the type of a work to be aligned.

Means for Solving the Problems

A work aligning system according to the present invention (e.g., a work aligning system 1 described later) includes a storage device (e.g., a storage device 10 described later) in which works (e.g., nuts 11 described later) are stored, an extraction rack (e.g., an extraction rack 30 described later) on which the works are placed, and a robot (e.g., a robot 20 described later) configured to grip and extract the works from the extraction rack to align the works. An electromagnet (e.g., an electromagnet 53 described later) is provided to an end of a robot arm (e.g., a robot arm 23 described later) of the robot. The storage device includes a plurality of buckets (e.g., buck- According to this invention, the work aligning system operates as follows.

First, a type of works to be aligned is selected, the transfer device of the storage device is driven, and the bucket in which these works of the type selected are stored is made to be positioned in a vicinity of the extraction rack.

Next, the electromagnet provided to the end of the robot arm is made to approach the bucket in which these selected works are stored, and the works inside the bucket are attracted by the electromagnet on the end of the robot arm. Under the above-mentioned situation, the robot arm is controlled to deliver the works onto the placement unit of the extraction rack, so that the works are gripped and aligned by the robot. Thereafter, the drive unit is driven to cause works remaining on the placement unit to be discharged to the bucket.

In this manner, the robot arm is controlled to cause the works to be automatically supplied from the bucket to the extraction rack and to be aligned on the extraction rack.

In addition, since the remaining works are returned to the bucket each time the alignment of the works completes, different types of works can be prevented from mixing, and the type of works to be aligned can be easily changed.

A method of moving a work according to the present invention is for a work aligning system that has a storage device in which works are stored, an extraction rack on which the works are placed, and a robot configured to grip and extract the works from the extraction rack to align the works, such that the works are moved between the storage device and the extraction rack. The method includes: attracting the works stored in a plurality of buckets, in which works of different types are stored, provided to the storage device, by way of an electromagnet provided to an end of a robot arm of the robot; moving the works from the storage device to the extraction rack; causing one bucket selected from among the plurality of buckets to be positioned in a vicinity of the extraction rack; and moving the works from the extraction rack to the storage device by discharging the works from the extraction rack to the bucket thus selected and positioned.

This invention brings about the effects similar to the aforementioned effects.

Effects of the Invention

According to the present invention, it is possible to automatically supply the works from the bucket to the extraction rack and to align the works on the extraction rack through controlling the robot arm. In addition, since the works remaining are returned to the bucket each time the alignment of the works completes, it is possible to prevent different types of works from mixing with each other and to change the type of works easily.

Figure 1:
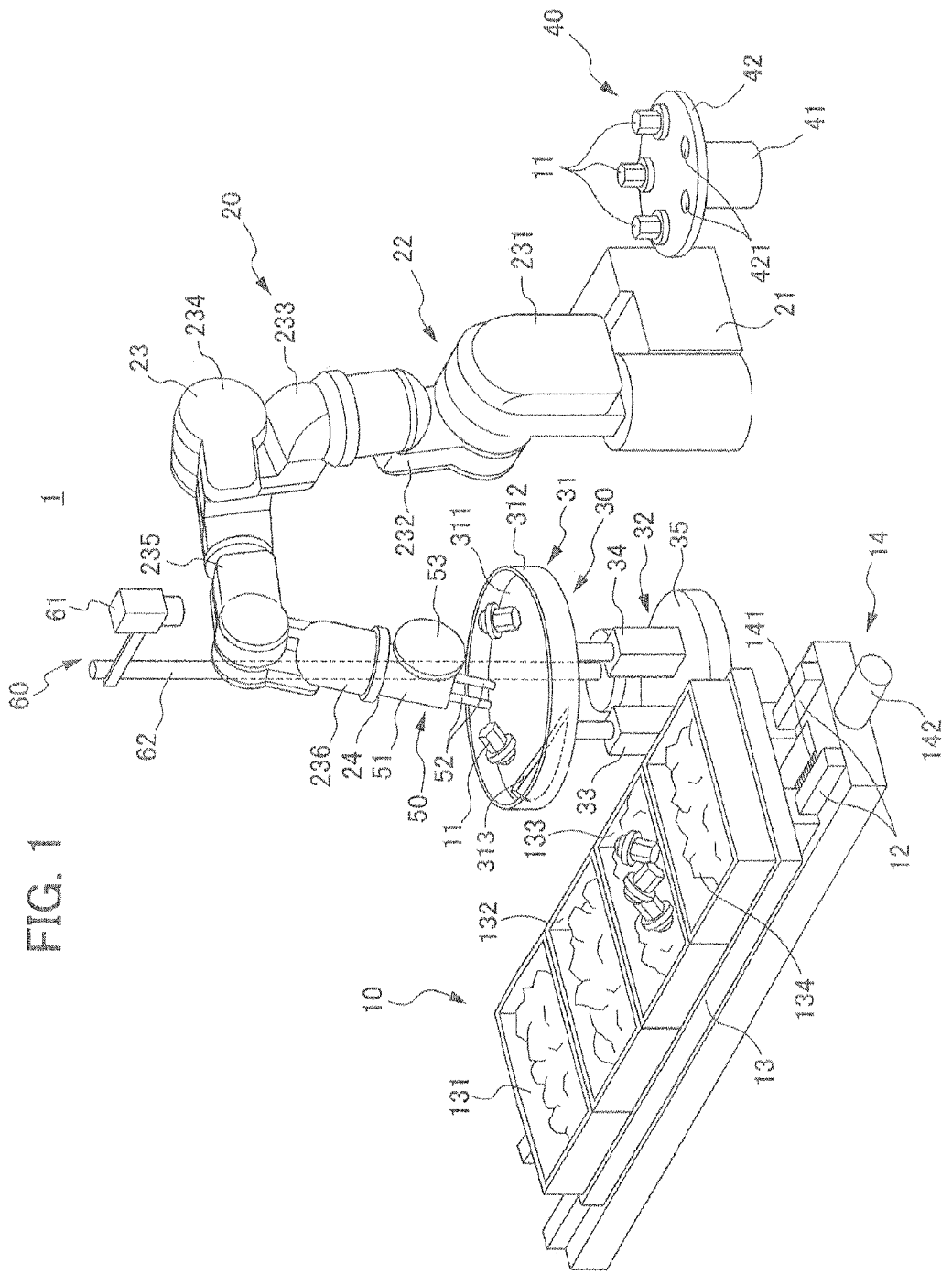
FIG. 1 is a perspective view of a work aligning system according to an embodiment of the present invention.

EXPLANATION OF REFERENCE NUMERALS 1 work aligning system
10 storage device
11 nut (work)
14 feed screw mechanism (transfer device)
20 robot
23 robot arm
30 extraction rack
31 placement unit
32 drive unit
53 electromagnet
131 first bucket
132 second bucket
133 third bucket
134 fourth bucket

PREFERRED MODE FOR CARRYING OUT THE INVENTION

Hereinafter, an embodiment of the present invention will be explained based on the drawings.

FIG. 1 is a perspective view of a work aligning system 1 according to the embodiment of the present invention.

The work aligning system 1 includes a storage device 10 in which nuts 11 used for fastening wheels are stored as works, an extraction rack 30 on which the nuts 11 are placed, a preset rack 40, a robot 20 that grips and extracts the nuts 11 from the extraction rack 30, and aligns with the preset rack 40, and a camera 60.

The robot 20 includes a robot main body 21 provided on a floor surface and a manipulator 22 provided to the robot main body 21.

The manipulator 22 with 7-axes includes a robot arm 23 pivotally supported to the robot main body 21, and a hand 50 that is pivotally supported to an end flange surface 24 of the robot arm 23.

The robot arm 23 includes a first arm portion 231, second arm portion 232, third arm portion 233, fourth arm portion 234, fifth arm portion 235, and sixth arm portion 236 in order from a side of the robot main body 21.

The first arm portion 231 extends substantially linearly, and is supported to the robot main body 21. The robot main body 21 causes the first arm portion 231 to rotate about a substantially vertical direction.

The second arm portion 232 extends substantially linearly, and is supported to the first arm portion 231. The first arm portion 231 causes the second arm portion 232 to rotate by a drive unit, which is not illustrated, about a direction intersecting an extending direction of the first arm portion 231. Accordingly, the angle formed between the extending direction of the first arm portion 231 and an extending direction of the second arm portion 232 changes.

The third arm portion 233 extending substantially linearly is pivotally supported to the second arm portion 232. The second arm portion 232 causes the third arm portion 233 to rotate by a drive unit, which is not illustrated, about the extending direction of the second arm portion 232.

The fourth arm portion 234 extends substantially linearly, and is pivotally supported to the third arm portion 233. The third arm portion 233 causes the fourth arm portion 234 to rotate by a drive unit, which is not illustrated, about a direction intersecting an extending direction of the third arm portion 233. Accordingly, the angle formed between the extending direction of the third arm portion 233 and an extending direction of the fourth arm portion 234 changes.

The fifth arm portion 235 extends substantially linearly, and is pivotally supported to the fourth arm portion 234. The fourth arm portion 234 causes the fifth arm portion 235 to rotate by a drive unit, which is not illustrated, about the extending direction of the fourth arm portion 234.

The sixth arm portion 236 extends substantially linearly, and is pivotally supported to the fifth arm portion 235. The fifth arm portion 235 causes the sixth arm portion 236 to rotate by a drive unit, which is not illustrated, about a direction intersecting an extending direction of the fifth arm portion 235. Accordingly, the angle formed between the extending direction of the fifth arm portion 235 and an extending direction of the sixth arm portion 236 changes.

The hand 50 includes a base 51 that is pivotally supported to the end flange surface 24 of the robot arm 23, a pair of holding portions 52 that is provided to the base 51 and can hold the nut 11, and an electromagnet 53 provided to the base 51.

The storage device 10 includes a slide rail 12 that is disposed on the floor surface and extends substantially horizontally, a slider 13 movable on this slide rail 12, a feed screw mechanism 14 as a transfer device that causes the slider 13 to move along the slide rail 12, and four buckets 131 to 134 provided to be aligned on the slider 13.

The slide rail 12 extends so as to pass through the vicinity of the extraction rack 30.

The four buckets 131 to 134 include a first bucket 131, second bucket 132, third bucket 133, and fourth bucket 134, each of which has a shape of a box with an open top. Different types of nuts 11 are stored in each of these four buckets 131 to 134.

The feed screw mechanism 14 includes a feed screw 141 that meshes with the underside of the slider 13, and a motor 142 that causes the feed screw 141 to rotate. The feed screw mechanism 14 causes the feed screw 141 to rotate by driving the motor 142, moving the slider 13. In this manner, the feed screw mechanism 14 can cause any one among the four buckets 131 to 134 to be positioned in a vicinity of the extraction rack 30.

The extraction rack 30 includes a placement unit 31 on which nuts 11 are placed, and a drive unit 32 that causes the position and attitude of the placement unit 31 to change. The placement unit 31 includes a placement unit main body 311 of a disk shape, and a wall portion 312 that stands at the circumference of the placement unit main body 311.

A cutout 313 configured to be as large as the nuts 11 can pass through is formed on a side of the storage device 10 in a circumferential portion of the placement unit main body 311.

The drive unit 32 includes a support portion 35 of a plate shape provided on a floor surface, and a first cylinder mechanism 33 and a second cylinder mechanism 34 that are provided to the support portion 35 so as to support the placement unit 31.

Figure 2:
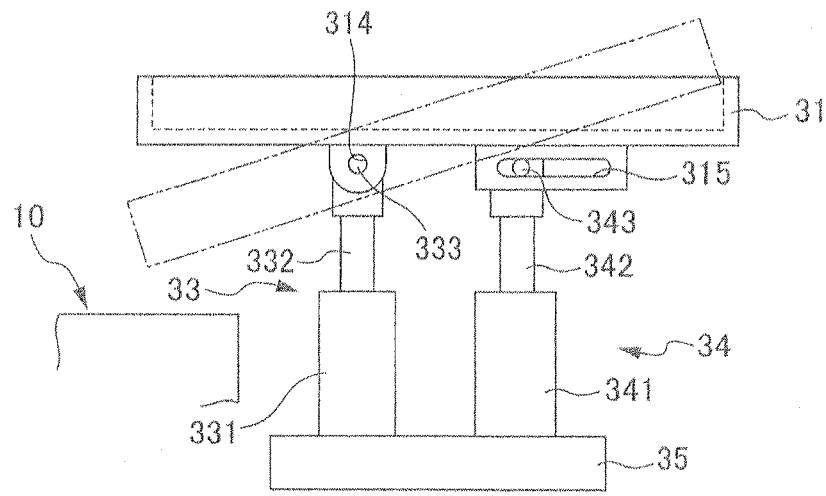
FIG. 2 is a side view of a drive unit of the work aligning system according to the embodiment.

FIG. 2 is a side view of the drive unit 32.

The first cylinder mechanism 33 includes a cylinder 331 that is fixed to the support portion 35 on a side of the storage device 10 and extends in a substantially vertical direction, and a piston 332 that is slidably accommodated in the cylinder 331. A pin 333 is provided at an end of the piston 332, and the pin 333 is rotatably coupled to a through hole 314 formed on an underside of the placement unit 31.

The second cylinder mechanism 34 includes a cylinder 341 that is fixed to the support portion 35 on a side opposite to the storage device 10 and extends in a substantially vertical direction, and a piston 342 that is slidably accommodated in this cylinder 341. A pin 343 is provided at an end of this piston 342, and the pin 343 is slidably coupled to an elongated hole 315 formed on the underside of the placement unit 31.

The drive unit 32 causes the piston 342 of the second cylinder mechanism 34 to rise as well as causing the piston 332 of the first cylinder mechanism to lower. When such an operation is performed, the pin 343 of the second cylinder mechanism 34 slides relative to the elongated hole 315, and the placement unit 31 pivots about the pin 333 of the first cylinder mechanism 33, whereby the placement unit 31 slopes.

In addition, the drive unit 32 causes the placement unit 31 to oscillate up and down by causing the piston 332 of the first cylinder mechanism 33 and the piston 342 of the second cylinder mechanism 34 to rise and fall synchronously.

Referring again to FIG. 1, the preset rack 40 includes a preset rack main body 41 provided on a floor surface and a placement unit 42 of a disk shape provided on the preset rack main body 41.

A plurality of insertion holes 421 through which the nuts 11 are inserted is formed along a periphery of the placement unit 42.

The camera 60 includes a camera main body 61 that captures an image of the robot 20 from above, and a fixed stand 62 that is provided on a floor surface and supports the camera main body 61.

The aforementioned work aligning system 1 operates as follows.

First, the bolts 11 of a type to be aligned are selected. The feed screw mechanism 14 of the storage device 10 is driven, and the bucket of the storage device 10 in which these bolts 11 of the type selected are stored, herein the third bucket 133, is moved to a vicinity of the extraction rack 30.

Next, based on a captured frame of the camera 60, the electromagnet 53 provided to the end of the robot arm 23 is made to approach the third bucket 133.

Figure 3:
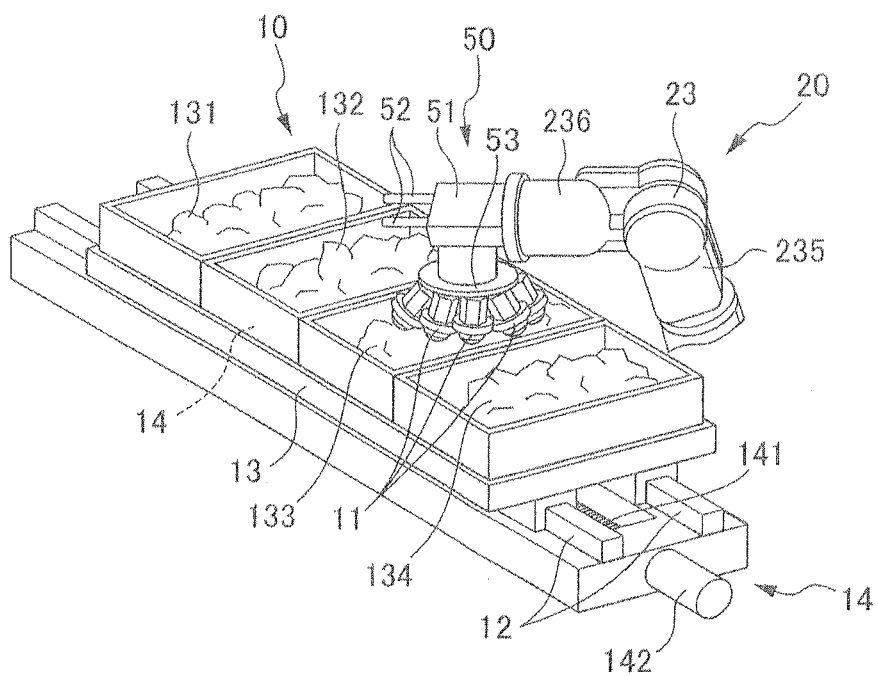
FIG. 3 is a perspective view for illustrating a sequence in which works are brought to an extraction rack of the work aligning system according to the embodiment.

Next, as shown in FIG. 3, the nuts 11 inside the third bucket 133 are attracted by the electromagnet 53 on the end of the robot arm 23.

Then, the robot arm 23 is controlled such that the nuts 11 are conveyed onto the placement unit 31 of the extraction rack 30. While the nuts 11 are piled up one another, it is difficult for the camera 60 to sense the position and attitude of each of the nuts 11.

Figure 4A:
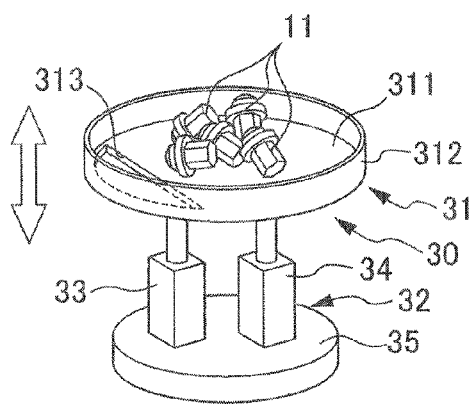
FIGS. 4A and 4B are each a perspective view for illustrating the sequence in which positions of works are caused to disperse on the work aligning system according to the embodiment.
Figure 4B:
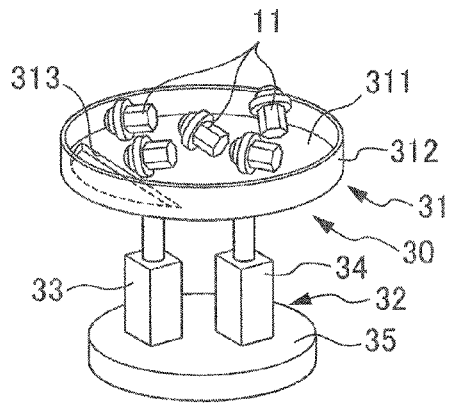

Thereupon, as shown in FIG. 4A, the drive unit 32 of the extraction rack 30 is driven, and the placement unit 31 is made to vertically rise and fall. With such an operation, vibrations are applied to the nuts 11, such that the positions of the nuts 11 on the placement unit 31 are made to disperse, as shown in FIG. 4B. Accordingly, the nuts 11 are made to be moderately exposed so as not to be on top of each other, and the position and attitude of each nut 11 can be easily sensed by the camera 60.

Next, based on the captured frame of the camera 60, each nut 11 is gripped by the holding portion 52 of the robot 20 and aligned on the preset rack 40. More specifically, based on the position and attitude of each nut 11 sensed by the camera 60, a rank associated with gripping ease is assigned in a sequential order to the nuts 11, and in accordance with this rank, the nuts 11 are grasped and aligned in the plurality of insertion holes 421 of the preset rack 40.

Figure 5:
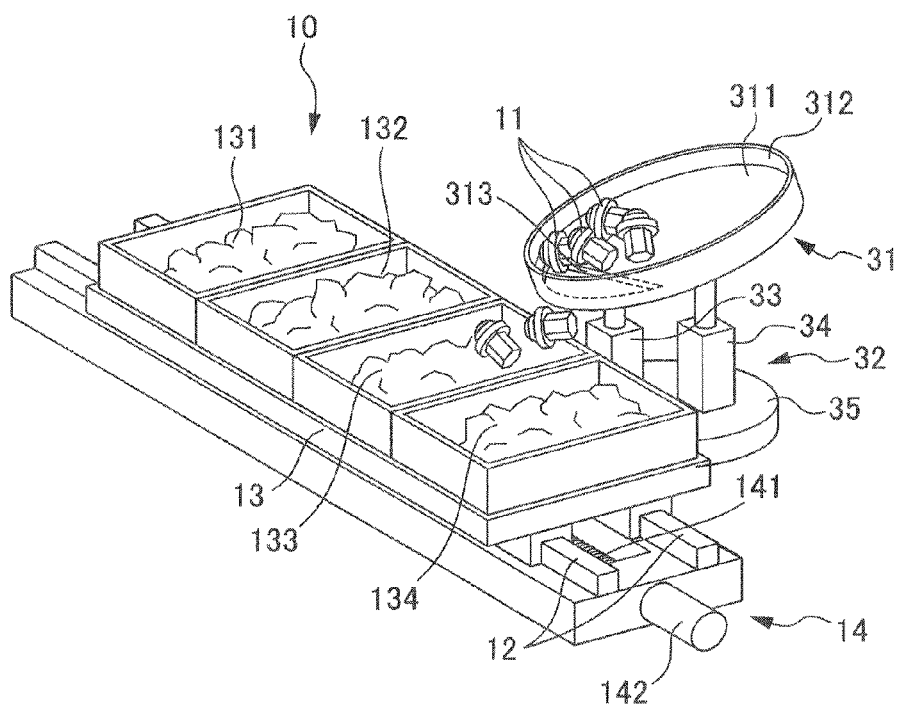
FIG. 5 is a perspective view for illustrating the sequence in which the remaining works are returned in the work aligning system according to the embodiment.

Thereafter, as shown in FIG. 5, the drive unit 32 of the extraction rack 30 is driven, and the placement unit 31 is made to slope towards the third bucket 133. In this manner, the nuts 11 remaining on the placement unit 31 are made to move towards the cutout 313 of the placement unit 31, pass through the cutout 313, and return to the third bucket 133.

According to the present embodiment, there are the following effects.

(1) By controlling the robot arm 23, the nuts 11 are automatically supplied from the third bucket 133 to the extraction rack 30, and the nuts 11 on the extraction rack 30 can be aligned in the preset rack 40.

In addition, since the nuts 11 remaining are caused to return to the buckets 131 to 134 each time the alignment of the nuts 11 completes, it is possible to prevent different types of nuts 11 from mixing and to easily change the type of nuts 11.

Furthermore, since the amount of nuts 11 on the placement unit 31 can be made constant, the recognition rate of nuts 11 of the camera 60 can be increased, so that the operation rate of the work aligning system 1 can be increased.

It should be noted that the present invention is not limited to the embodiment, and modifications, improvements, and the like within the scope that can achieve the object of the present invention are included in the present invention.

For example, although the nuts 11 have been utilized as the work in the present embodiment, it is not limited thereto and may alternatively be a bolt.

In addition, although the work has been made to move towards the cutout by causing the placement unit 31 to slope in the present embodiment, it is not limited thereto. Alternatively, a wiper mechanism may be provided to the placement unit of the extraction rack, and the work may be made to move to the side of the cutout by driving this wiper mechanism.

The invention claimed is:

1. A work aligning system, comprising:
a storage device in which works are stored;
an extraction rack on which the works are placed; and
a robot configured to convey the works from the storage device to the extraction rack, and to grip and extract the works from the extraction rack to align the works,
wherein an electromagnet is provided to an end of a robot arm of the robot,
wherein the storage device comprises a plurality of buckets in which works of different types are stored, and a transfer device configured to cause one bucket selected from among the plurality of buckets to be positioned in a vicinity of the extraction rack,
wherein the extraction rack comprises a placement unit on which the works are placed, and a drive unit configured to discharge the works on the placement unit to the one bucket selected from among the plurality of buckets, and
wherein the drive unit is configured to cause the placement unit to discharge remaining works on the placement unit through a cutout of the placement unit to the one selected bucket after the robot finishes alignment of the works.

2. The work aligning system according to claim 1, wherein the drive unit is configured to cause the placement unit to slope with respect to the selected one bucket to discharge the remaining works through the cutout.

3. The work aligning system according to claim 1, wherein the drive unit comprises a wiper which causes the remaining works to be discharged through the cutout.

4. The work aligning system according to claim 1, wherein the drive unit causes the placement unit to rise and fall to disperse positions of the works on the placement unit.

5. A method of moving works for a work aligning system that comprises a storage device in which the works are stored, an extraction rack on which the works are placed, and a robot configured to grip and extract the works from the extraction rack to align the works, such that the works are moved between the storage device and the extraction rack, the method comprising:
- attracting the works stored in a plurality of buckets, in which works of different types are stored, provided to the storage device, by way of an electromagnet provided to an end of a robot arm of the robot;
- moving the works from the storage device to the extraction rack;
- causing one bucket selected from among the plurality of buckets to be positioned in a vicinity of the extraction rack;
- moving the works from the extraction rack to the storage device by discharging the works from the extraction rack to the bucket thus selected and positioned,
- wherein the extraction rack comprises a placement unit on which the works are placed and a drive unit configured to discharge the works on the placement unit, and
- wherein the step of moving the works from the extraction rack to the storage device is performed by the drive unit causing the placement unit to discharge the works through a cutout of the placement unit.

* * * * *